(12) United States Patent
Bögert et al.

(10) Patent No.: US 7,017,374 B2
(45) Date of Patent: Mar. 28, 2006

(54) DEVICE FOR CLOSING AND OPENING THE MOLD HALVES OF A GLASS MOLDING MACHINE

(75) Inventors: Hermann Bögert, Auetal (DE); Manfred Drawert, Nienstädt (DE)

(73) Assignee: Heye International GmbH, Obernkirchen (DE)

( * ) Notice: Subject to any disclaimer, the term of this patent is extended or adjusted under 35 U.S.C. 154(b) by 434 days.

(21) Appl. No.: 10/275,796

(22) PCT Filed: Sep. 20, 2001

(86) PCT No.: PCT/EP01/10865

§ 371 (c)(1),
(2), (4) Date: Nov. 8, 2002

(87) PCT Pub. No.: WO02/46111

PCT Pub. Date: Jun. 13, 2002

(65) Prior Publication Data

US 2004/0099012 A1    May 27, 2004

(30) Foreign Application Priority Data

Dec. 6, 2000    (DE) .......................... 200 20 657 U

(51) Int. Cl.
C03B 9/16    (2006.01)
C03B 9/353    (2006.01)
(52) U.S. Cl. .............................. 65/323; 65/357; 65/360
(58) Field of Classification Search .................. 65/323, 65/357, 360
See application file for complete search history.

(56) References Cited

U.S. PATENT DOCUMENTS 1,911,119 A    5/1933    Ingle ........................... 65/219
4,599,101 A    7/1986    Douglas et al. ............... 65/164

FOREIGN PATENT DOCUMENTS

| DE | 20 27 243 | 4/1978 |
| DE | 198 51 133 A1 | 5/1999 |
| DE | 299 16 216 U1 | 3/2000 |
| EP | 0 789 004 A2 | 8/1997 |
| FR | 2 782 509 | 8/1998 |
| GB | 1297704 | * 11/1972 |
| GB | 2 331 096 | 5/1999 |

* cited by examiner

Primary Examiner—Sean Vincent
(74) Attorney, Agent, or Firm—Synnestvedt & Lechner LLP

(57) ABSTRACT

Each mold half is held by means of a mold half holding mechanism which can be driven so as to pivot in a reciprocating manner about a common vertical hinge column by means of a vertical shaft (6; 7), which is mounted in a rotatable manner in a frame (2) of the glass forming machine (1), and by means of first intermediate members. Each shaft (6; 7) is connected via a lever mechanism (8; 9) to a common drive shaft which can be pivoted in a reciprocating manner by means of a drive element (19), which can be moved linearly in a reciprocating manner, of a drive (20) and by means of second intermediate members (18). The drive element (19) can be mounted on a nut (26) and secured against rotating about a longitudinal axis (39) of the drive element (19) by means of a guide device (32). The nut (26) is in engagement with a spindle (33). The spindle (33) is mounted in an axially fixed, rotatable manner and can be driven rotationally in a reciprocating manner by means of the drive (20).

20 Claims, 3 Drawing Sheets

DEVICE FOR CLOSING AND OPENING THE MOLD HALVES OF A GLASS MOLDING MACHINE

BACKGROUND OF THE INVENTION

The invention relates to a device for closing and opening mold halves of at least one mold of glass forming machine.

In the case of a known device of this type (U.S. Pat. No. 1,911,119A, FIGS. 3 and 8, or DE 20 27 243 B2, FIG. 3), the devices for closing and opening the blank mold halves and finishing mold halves are formed in a similar manner. In each case, the two intermediate members are driven in a reciprocating manner by means of a piston rod of a piston-cylinder unit. The two piston-cylinder units are disposed in the interior of the frame (box) of the I.S. (individual section) glass forming machine. In this manner, the two piston-cylinder units take up a lot of useful space inside the frame. Moreover, the linear movement of each piston rod is no longer sufficiently precise and suitably reproducible to meet the current requirements for the production of hollow glass.

A parallel closing device for mold halves is known per se from DE 198 51 133 A1. A servo motor is arranged with a vertical longitudinal axis and drives a lead screw by means of its upper driven shaft via a coupling, which lead screw comprises lower left-hand threads and upper right-hand threads. In each case a leftward nut and a rightward nut are in engagement with these opposed threads. The nuts are each connected via an articulated lever pair to a common horizontal pivot shaft. The pivot shaft together with the mold half support mechanisms is moved in a reciprocating manner in a horizontal plane upon rotation of the lead screw. FIG. 3 illustrates the closed mold position, whereas FIG. 4 shows the open mold position. This design is comparatively costly and requires a relatively large amount of space both in the horizontal and vertical direction.

From DE 299 16216 U1 of the Applicant it is known perse to drive a worm rotationally in a reciprocating manner by means of a drive. At diametrically opposed positions, gear wheels are in engagement with the worm. Each gear wheel is affixed to a shaft which supports a crank. Each crank is connected via a particular lever mechanism to a pivotal mold tool half holding mechanism.

From FIGS. 3 and 4 of GB 2 331 096 A and FIGS. 3 and 4 of FR 2 782 509 A1 a device according to FIGS. 3 and 4 of the previously discussed DE 198 51 133 A1 is known per se in each case.

SUMMARY OF THE INVENTION

It is the object of the invention to reduce the spatial requirement of the device inside the frame and to render it possible to drive the second intermediate members in a very precise and extremely reproducible manner.

In one form, this object is achieved by providing a device for closing and opening mold halves of at least one mold of a glass forming machine. Each mold half is held by means of a mold half holding mechanism, wherein each mold half holding mechanism can be driven so as to pivot in a reciprocating manner about a vertical hinge column by means of a vertical shaft, which is mounted in a rotatable manner in a frame of the glass forming machine. Each veritcal shaft is connected via a lever mechanism to a common drive shaft. The drive shaft can be pivoted in a reciprocating manner by means of a drive element, which can be moved linearly in a reciprocating manner, and by means of second intermediate members. The drive element can be mounted on a nut and is secured against rotating about a longitudinal axis of the drive element by means of a guide device. The nut is in engagement with a spindle, and the spindle is mounted in an axially fixed, rotatable manner and can be driven rotationally in a reciprocating manner by means of a drive. In this manner, it is possible to provide a space-saving and yet very precisely operating device for closing and opening the mold halves. This device is particularly suitable for use in I.S. glass forming machines.

On a first side, which can be fixed on the nut, the drive element can include an orifice which accommodates a free end of the spindle, and a second side of the drive element remote from the first side can be coupled to the second intermediate members. In this way a device is provided with an advantageously interleaved structural design which saves a correspondingly large amount of space.

The second side can be mounted in an axially displaceable manner in a bearing housing supported on the frame to provide a compact bearing unit. The bearing unit can have the bearing of the spindle integrated therein, for example, the spindle can be mounted in a rotatable manner in the bearing housing.

Features that include a stationary part of the guide device connected to the bearing housing to render it possible in a particularly precise manner to guide the nut and to prevent rotation thereof Additional features can be provided where the stationary part includes at least one guide rod which is disposed in parallel with the spindle, and an extension of the guide device which is fixed relative to the nut is guided in a displaceable manner on the at least one guide rod. This makes it possible in a simple yet extremely precise manner to guide the nut and prevent rotation thereof.

As another feature of the invention, the bearing housing can be disposed in an internal space in the frame so that the bearing housing and the guide device take up only a very small amount of space in the frame, e.g. in the box of an I.S. glass forming machine.

In yet another feature, the drive includes an electro-servo motor connected via a transmission and a coupling to the spindle to ensure an extremely precise, programmably controllable drive.

The electro-servo motor can be disposed with a horizontal longitudinal axis outside the frame so that it takes up a particularly small amount of space inside the frame.

The transmission can protrudes from outside the frame into an opening in the frame and be mounted in the opening in such a manner as to be rotatable and axially displaceable about its longitudinal axis. A housing of the transmission can be connected to a sleeve and the sleeve can be connected to the bearing housing. This provides a compact drive line having the required freedom of movement in the region where it is introduced into the frame. However, this region, it is only necessary to take into account extremely small relative movements between the drive line and the frame.

The transmission can be formed as an angular transmission, and a longitudinal axis of the electro-servo motor can be disposed in parallel with an external wall of the frame. This provides a space-saving arrangement which is particularly favorable for the electro-servo motor, because its bearings are loaded to the least extent when it is arranged horizontally.

DESCRIPTION OF THE DRAWINGS

These and further features and advantages of the invention will be explained in detail hereinafter with reference to the embodiment illustrated in the drawings, in which.

DETAILED DESCRIPTION OF THE INVENTION

Figure 1:
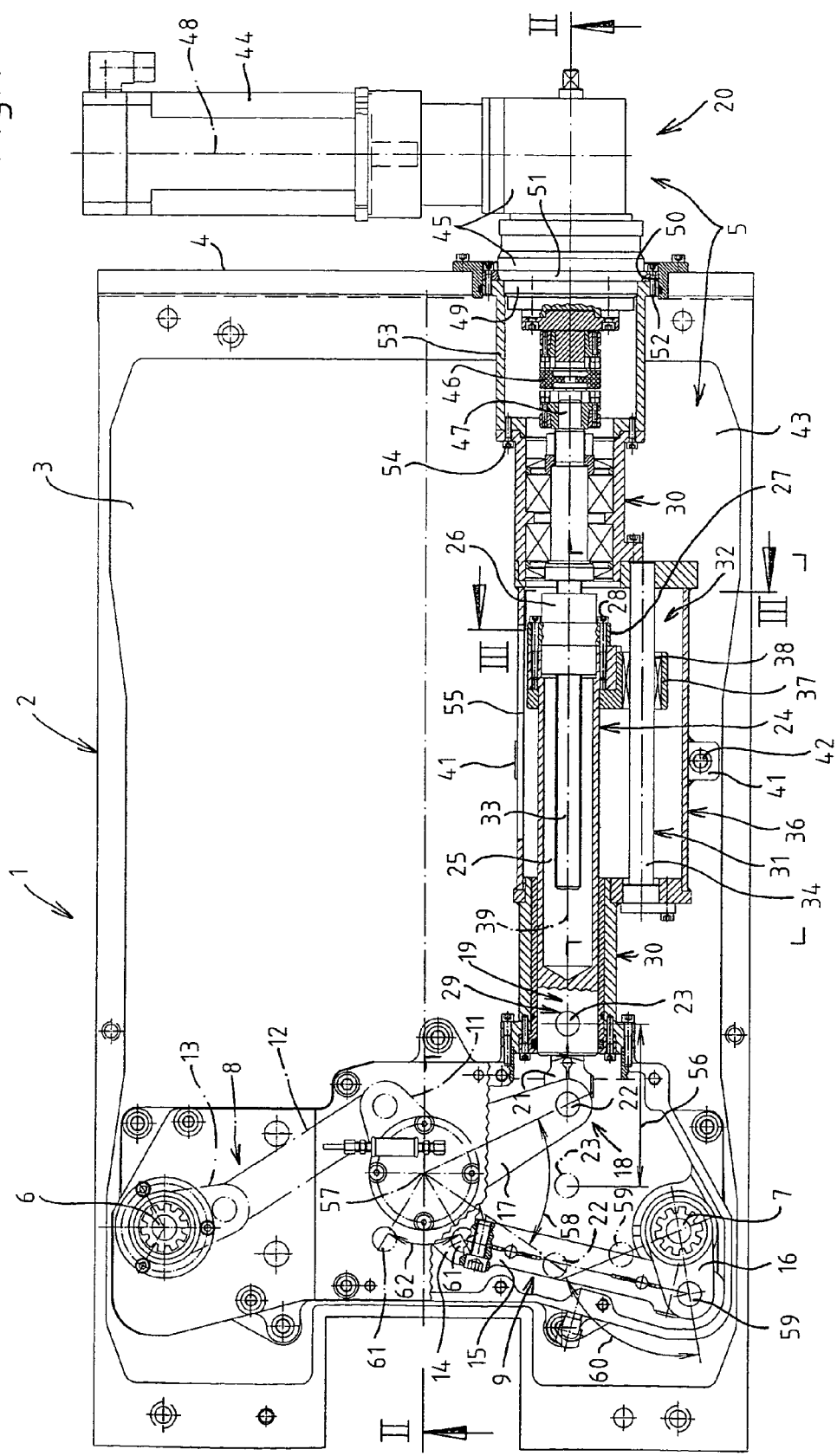
FIG. 1 shows a partially cut-away plan view of one embodiment of the device.

FIG. 1 shows a part of a glass forming machine 1, in this case a section of an I.S. glass forming machine. The glass forming machine 1 comprises a frame (box) 2 having an internal space 3 and an external wall 4.

A device 5 for opening and closing mold halves of at least one mold of the glass forming machine 1 is disposed partially in the internal space 3 and partially outside the frame 2. The mold halves, mold half support mechanisms, hinge column and first intermediate members are known per se e.g. from U.S. Pat. No. 1,911,119A and therefore will not be illustrated and described again here. In the present drawings, the device 5 is intended to close and open finishing mold halves. However, in a similar manner it is also possible to form a device for closing and opening blank mold halves of the glass forming machine 1.

Figure 2:
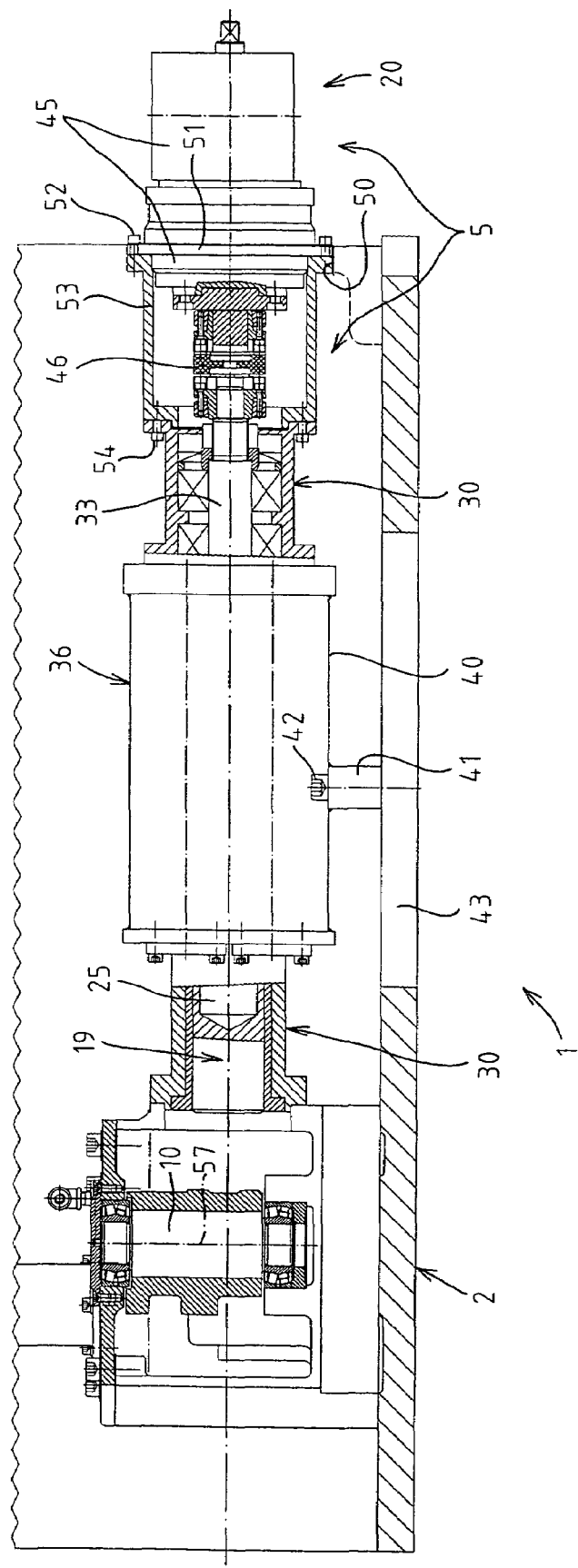
FIG. 2 shows the partially cut-away view taken along line II—II in FIG. 1.

In the frame 2, vertical shafts 6 and 7 are mounted in a rotatable manner and drive the aforementioned first intermediate members [not illustrated]. Each shaft 6, 7 is connected via a lever mechanism 8 and 9 to a common drive shaft 10 (FIG. 2). The lever mechanism 8 consists of an arm 11 which is affixed to the drive shaft 10, a steering rod 12 which is articulated to the arm, and a crank 13 which is articulated to the steering rod 12 and affixed to the shaft 6. In a similar manner, the lever mechanism 9 consists of an arm 14 which is affixed to the drive shaft 10, a steering rod 15 which is articulated to the arm 14, and a crank 16 which is articulated to the steering rod 15 and is affixed to the shaft 7. Moreover, a lever 17 is affixed to the drive shaft 10 and is a component of second intermediate members 18 between the drive shaft 10 and a drive element 19 of a drive 20.

In addition to the lever 17, the second intermediate members 18 include a bracket 21 which is articulated on one side by a pin 22 to the lever 17 and is articulated on the other side by a pin 23 to the drive element 19. The drive element 19 can be moved linearly in a reciprocating manner by means of the drive 20. The drive element 19 comprises on a first side 24 (on the right in FIG. 1) an axial orifice 25 (an opening), into which a portion of a nut 26 extends on the right-hand side. The nut 26 comprises an annular flange 27 which is affixed to the drive element 19 by means of screws 28.

A second side 29 of the drive element 19, which side is remote from the first side 24, supports the pin 23 and is mounted in such a manner as to be axially displaceable in a bearing housing 30. The bearing housing 30 also comprises a stationary part 31 of a guide device 32.

A free end of a spindle 33 extends through the nut 26 into the orifice 25 and its other end (on the right in FIG. 1) is likewise mounted in a rotatable yet axially fixed manner in the bearing housing 30.

The stationary part 31 of the guide device 32 comprises two guide rods 34 and 35 (cf. also FIG. 3) which are disposed in parallel with the spindle 33 and which are fixed in an intermediate housing 36 of the bearing housing 30. An extension 37 which is fixed to the drive element 19 is guided in a displaceable manner on the guide rods 34, 35 by means of ball-guided sleeves 38. Although the drive element 19 is thus axially displaceable, it is also effectively and precisely secured against rotating about its own longitudinal axis 39.

Welded to the underside 40 (FIGS. 2 and 3) of the intermediate housing 36, is a transverse bar 41, through which a screw 42 is screwed into a base 43 of the frame 2 in order to fix the bearing housing 30.

In this way, the bearing housing 30, the drive element 19, the spindle 33 and the guide device 32 are disposed in such a manner as to save space in the internal space 3 of the frame 2.

The drive 20 comprises an electro-servo motor 44 which is connected via an angular transmission 45 and a coupling 46 to a drive spigot 47 of the spindle 33. The electro-servo motor 44 is disposed with a horizontal longitudinal axis 48, which is in parallel with the external wall 4, outside the frame 2. A part 49 of the angular transmission 45 formed as a planetary gear extends from outside the frame 2 into an opening 50 in the external wall 4 of the frame 2. The transmission part 49 comprises an external flange 51, via which it is screwed by means of screws 52 to a sleeve 53. For its part, the sleeve 53 is screwed by means of screws 54 to the end of the bearing housing 30 on the right-hand side in FIG. 1.

The electro-servo motor 44 and the angular transmission 45 can be accessed rapidly and easily on the external side of the frame 2. The other parts of the device 5 can also be accessed easily. This is also made possible by a side window 55 in the intermediate housing 36.

In the lower half of FIG. 1, all elements are illustrated by continuous lines in the particular operational end position, in which the associated mold halves are closed. In contrast, in the upper half of FIG. 1, the elements 11, 12, 13 and 6 are illustrated by broken lines in the particular operational end position, in which the mold halves are fully open.

Moreover, in the lower half of FIG. 1, some of the elements are illustrated by broken lines in the particular operational end position corresponding to the fully open position of the mold halves. By rotating the spindle 33 the pin 23 is thus displaced in a linear manner to the left in FIG. 1 by a stroke 56. The pin 22 travels on a circular arc about a longitudinal axis 57 of the drive shaft 10 across an angle 58. As a result, a pin 59 between the crank 16 and the steering rod 15 is displaced across an angle 60. At the same time, a pin 61 between the arm 14 and the steering rod 15 pivots upwards in FIG. 1 across an angle 62 until reaching the end position illustrated by broken lines.

Owing to the substantial transmission ratio downstream of the electro-servo motor 44, the closed mold halves can be kept closed with, comparatively speaking, a very low level of torque on the output shaft of the electro-servo motor 44.

Figure 3:
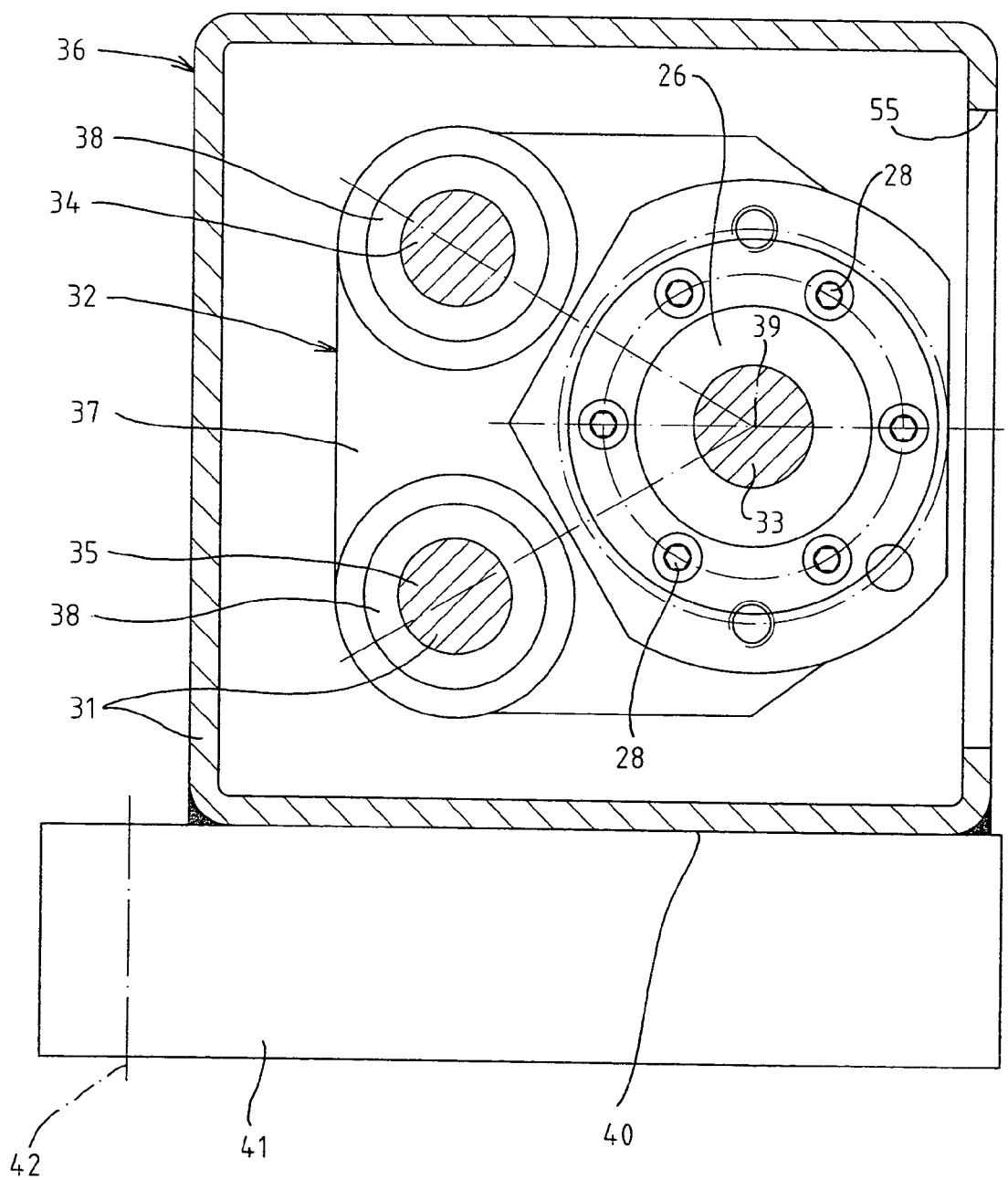
FIG. 3 shows the enlarged sectional view taken along line III—III in FIG. 1.

FIGS. 2 and 3 show further details of the glass forming machine 1 and the device 5.

What is claimed is:

1. A device for closing and opening mold halves of at least one mold of a glass forming machine, comprising:
   a mold half holding mechanism for each of said mold halves;
   a glass forming machine frame;
   a drive for effecting the opening and closing of said mold halves;

a spindle mounted in an axially fixed manner, said spindle being drivable rotatably in a reciprocal manner by said drive;

a nut mounted for linear reciprocal movement in response to rotational movement of said spindle;

a drive element having a longitudinal axis, said drive element being mounted for reciprocal linear movement in response to movement of said nut;

a guide device disposed to prevent rotational movement of said drive element;

a drive shaft mounted for reciprocal pivotal movement in response to movement of said drive element; and each of said mold halves being associated with a vertical shaft connected via a lever mechanism to said drive shaft, said vertical shafts being mounted in said frame for rotational movement in response to movement by said drive shaft, each of said mold half holding mechanisms being pivotal in a reciprocal manner in response to movement of said vertical shaft associated therewith.

2. A device in accordance with claim 1 wherein said drive element has a first side which is fixed to said nut, said first side including an opening extending therein, said spindle having a free end disposed within said opening; and said drive element having a second side remote from said first side, said second side being connected to said drive shaft via intermediate members.

3. A device in accordance with claim 2 wherein said second side is mounted in an axially displaceable manner in a bearing housing supported on said frame.

4. A device in accordance with claim 3 wherein said spindle is mounted in a rotatable manner in said bearing housing.

5. A device in accordance with claim 3 wherein said guide device has a stationary part which is connected to said bearing housing.

6. A device in accordance with claim 4 wherein said guide device has a stationary part which is connected to said bearing housing.

7. A device in accordance with claim 5 wherein said stationary part of the guide device comprises at least one guide rod which is disposed in parallel with the spindle, and said guide device has an extension which is fixed relative to said nut and which is guided in a displaceable manner on said at least one guide rod.

8. A device in accordance with claim 3 wherein said bearing housing is disposed in an internal space in the frame.

9. A device in accordance with claim 5 wherein said bearing housing is disposed in an internal space in the frame.

10. A device in accordance with claim 1 wherein said drive comprises an electro-servo motor.

11. A device in accordance with claim 10 wherein said electro-servo motor is connected via a transmission and a coupling to the spindle.

12. A device in accordance with claim 11 wherein said electro-servo motor is disposed along a horizontal longitudinal axis outside said frame.

13. A device in accordance with claim 11 wherein said transmission protrudes from outside the frame into an opening in the frame and is mounted in the opening in such a manner as to be rotatable and axially displaceable about said longitudinal axis, and said transmission having a housing which can be connected to a sleeve, said sleeve being connectable to the bearing housing.

14. A device in accordance with claim 12 wherein said transmission protrudes from outside the frame into an opening in the frame and is mounted in the opening in such a manner as to be rotatable and axially displaceable about said longitudinal axis, and said transmission having a housing which can be connected to a sleeve, said sleeve being connectable to the bearing housing.

15. A device in accordance with claim 11 wherein said transmission is formed as an angular transmission, and said electro-servo motor has a longitudinal axis disposed in parallel with an external wall of the frame.

16. A device in accordance with claim 13 wherein said transmission is formed as an angular transmission, and said electro-servo motor has a longitudinal axis disposed in parallel with an external wall of the frame.

17. A device for closing and opening mold halves of at least one mold of a glass forming machine, comprising:

a mold half holding mechanism for each of said mold halves;

a glass forming machine frame;

a drive for effecting the opening and closing of said mold halves;

a spindle mounted in an axially fixed manner, said spindle being drivable rotatably in a reciprocating manner by said drive;

a nut in engagement with said spindle for linear reciprocal movement in response to rotational movement of said spindle;

a drive element having a longitudinal axis, said drive element being mounted on said nut for reciprocal linear movement in response to movement of said nut;

a guide device disposed to prevent rotational movement of said drive element about said longitudinal axis;

a drive shaft mounted for reciprocal pivotal movement in response to movement of said drive element, said drive shaft being movable in response to movement of said drive element through intermediate members which include a lever affixed to said drive shaft; and each of said mold halves being associated with a vertical shaft, each of said vertical shafts being connected via a lever mechanism to said drive shaft, said vertical shafts being mounted in said frame for rotational movement in response to movement by said drive shaft, each of said mold half holding mechanisms being pivotal in a reciprocal manner in response to movement of said vertical shaft associated therewith.

18. A device for closing and opening mold halves of at least one mold of a glass forming machine, comprising:

a mold half holding mechanism for each of said mold halves;

a glass forming machine frame;

a drive for effecting the opening and closing of said mold halves;

a spindle mounted in an axially fixed manner, said spindle being drivable rotatably in a reciprocal manner by said drive;

a nut in engagement with said spindle for linear reciprocal movement in response to rotational movement of said spindle;

a drive element affixed to said nut for reciprocal linear movement in response to movement of said nut, said drive element having a longitudinal axis and a first side which is fixed to said nut, said first side including an opening extending therein, said spindle having a free end disposed within said opening, and said drive element having a second side remote from said first side which is mounted in an axially displaceable manner in a bearing housing supported on said frame;

a guide device disposed to prevent rotational movement of said drive element;

a drive shaft mounted for reciprocal pivotal movement in response to movement of said drive element, said second side of said drive element being connected to said drive shaft via intermediate members which include a lever affixed to said drive shaft for rotational movement therewith; and each of said mold halves being associated with a vertical shaft connected via a lever mechanism to said drive shaft, said vertical shafts being mounted in said frame for rotational movement in response to movement by said drive shaft, each of said mold half holding mechanisms being pivotal in a reciprocal manner in response to movement of said vertical shaft associated therewith.

19. A device in accordance with claim 18 wherein said guide device has a stationary part which is connected to said bearing housing.

20. A device in accordance with claim 19 wherein said stationary part of the guide device comprises at least one guide rod which is disposed in parallel with the spindle, and said guide device has an extension which is fixed relative to said nut and which is guided in a displaceable manner on said at least one guide rod.

* * * * *